(12) United States Patent
Hagen et al.

(10) Patent No.: US 10,400,624 B2
(45) Date of Patent: Sep. 3, 2019

(54) SYSTEM AND METHOD FOR PLANNING ENGINE BORESCOPE INSPECTIONS BASED ON FOD PROBABILITY ESTIMATION

(71) Applicant: UNITED TECHNOLOGIES CORPORATION, Farmington, CT (US)

(72) Inventors: Gregory S. Hagen, Glastonbury, CT (US); Linda I. Rivera, Norwalk, CT (US); Alexander I. Khibnik, Melrose, MA (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 214 days.

(21) Appl. No.: 15/590,694

(22) Filed: May 9, 2017

(65) Prior Publication Data

US 2018/0328221 A1    Nov. 15, 2018

(51) Int. Cl.
    *F01D 21/00*    (2006.01)
    *G01M 15/14*    (2006.01)

(52) U.S. Cl.
    CPC ........... *F01D 21/003* (2013.01); *G01M 15/14* (2013.01); *F05D 2260/80* (2013.01); *F05D 2260/82* (2013.01); *F05D 2270/305* (2013.01); *F05D 2270/311* (2013.01); *F05D 2270/312* (2013.01); *F05D 2270/313* (2013.01); *F05D 2270/333* (2013.01); *F05D 2270/71* (2013.01); *F05D 2270/8041* (2013.01)

(58) Field of Classification Search
    CPC ................. F01D 21/003; G01M 15/14; F05D 2270/8041; F05D 2270/333; F05D 2270/305; F05D 2270/312; F05D 2270/71; F05D 2260/80; F05D 2260/82; F05D 2270/311; F05D 2270/313
    See application file for complete search history.

(56) References Cited

U.S. PATENT DOCUMENTS

| 7,769,507 B2 | 8/2010 | Volponi et al. |
| 9,037,381 B2 | 5/2015 | Care |
| 9,046,000 B2 | 6/2015 | Kominsky |

(Continued)

*Primary Examiner* — Alan D Hutchinson
(74) *Attorney, Agent, or Firm* — Cantor Colburn LLP (57) ABSTRACT

A system for identifying timeframes for borescope inspections for a gas turbine engine, having: monitoring systems monitor engine conditions, derive engine condition information and communicate such information to processors; feature interpreter module electronically communicates (i) with processors to process engine condition information, and (ii) feature interpreter information to processors, such information defines a probability of a FOD event; accumulator module electronically communicates (i) with processors to processes feature interpreter information, stored information since a last borescope inspection, and (ii) accumulator information to processors, such information defines an accumulated probability of a FOD event; and predictor and inspection planner module electronically communicates (i) with processors to processes accumulator information and stored information defines a threshold limits for a probability of a FOD event, and (ii) predictor and inspection planner information to processors, such information identifies a timeframe for a next borescope inspections predicted to occur before a FOD event.

16 Claims, 7 Drawing Sheets

(56) References Cited

U.S. PATENT DOCUMENTS

| | | |
|---|---|---|
| 9,395,270 B2 | 7/2016 | Czerniak et al. |
| 2002/0082788 A1* | 6/2002 | Marshall Smith ..... G06Q 10/10 |
| | | 702/83 |
| 2004/0225474 A1* | 11/2004 | Goldfine ............ G01N 27/9046 |
| | | 702/183 |
| 2009/0113519 A1 | 4/2009 | Novis et al. |
| 2013/0220004 A1* | 8/2013 | Epstein ................. G01M 15/14 |
| | | 73/112.01 |
| 2016/0307377 A1* | 10/2016 | Gaulard ................. G06Q 10/04 |
| 2018/0058251 A1* | 3/2018 | Reigl .................... F01D 17/145 |
| 2018/0058253 A1* | 3/2018 | Reigl .................... F01D 21/003 |
| 2018/0058254 A1* | 3/2018 | Reigl ...................... F16K 37/00 |
| 2018/0094536 A1* | 4/2018 | Crothers .............. F01D 21/003 |
| 2018/0266269 A1* | 9/2018 | Blakeman ............. F01D 21/003 |

\* cited by examiner

SYSTEM AND METHOD FOR PLANNING ENGINE BORESCOPE INSPECTIONS BASED ON FOD PROBABILITY ESTIMATION

STATEMENT OF FEDERAL SUPPORT

This invention was made with Government support under Contract N00019-14-C-0026 awarded by the United States Navy. The Government has certain rights in the invention.

BACKGROUND

Exemplary embodiments pertain to the art of maintenance inspections to mechanical systems and more specifically to planning engine borescope inspections based on Foreign Object Detection ("FOD") probability estimations.

Engine borescope inspections may be time-consuming and therefore costly. These inspections may be planned in advance to minimize disruption to operational schedules. Borescope inspection intervals may be in the range from every tens of Engine Flight Hours ("EFH") to thousands of EFH. Longer inspection intervals provide more operational efficiency and maintenance cost reduction with the trade-off of increased risk due to FOD events. On the other hand inspection intervals may need to shorten in response to detecting FOD events.

In some cases technical improvements in FOD detection may result in an increase in borescope inspections because FOD detection may lead to ad-hoc inspections in addition to scheduled inspections. If FOD detection occurs too often due to false alarms there is an operational risk of a decrease in operational efficiency and an increase in maintenance costs.

BRIEF DESCRIPTION

Disclosed is a system for identifying a timeframe for a next one or more borescope inspections for a gas turbine engine, comprising: one or more monitoring systems that monitor conditions of the engine, the one or more monitoring systems derive engine condition information and communicate the engine condition information to one or more data processors; a feature interpreter module that electronically communicates with the one or more data processors to process the engine condition information, the feature interpreter module electronically communicates feature interpreter information to the one or more data processors, wherein the feature interpreter information defines a probability of a Foreign Object Detection (FOD) event; an accumulator module that electronically communicates with the one or more data processors to processes the feature interpreter information, stored information since a last borescope inspection, and the accumulator module electronically communicates accumulator information to the one or more data processors, wherein the accumulator information defines an accumulated probability of a FOD event; and a predictor and inspection planner module that electronically communicates with the one or more processors to processes the accumulator information and stored information that defines a threshold limits for a probability of a FOD event, and the predictor and inspection planner module electronically communicates predictor and inspection planner information to the one or more data processors, the predictor and inspection planner information identifies a timeframe for a next one or more borescope inspections predicted to occur before a FOD event.

In addition to one or more of the features described above, or as an alternative, further embodiments may include one or more of a first debris monitoring system, the first debris monitoring system includes a first onboard debris sensor that monitors debris from a fan and compressor section, the first debris monitoring system electronically communicates monitored first debris data as engine condition information to the one or more data processors; a blade health monitoring system, the blade health monitoring system includes an onboard blade health sensor that monitors blade health from one or both of the fan and compressor section and a turbine section, the blade health monitoring system electronically communicates monitored blade health data as engine condition information to the one or more data processors; a second debris monitoring system, the second debris monitoring system includes an second onboard debris sensor that monitors debris from a turbine section, the second debris monitoring system electronically communicates monitored second debris data as engine condition information to the one or more data processors; or an engine environmental condition monitoring system, the engine environmental condition monitoring system includes an onboard engine environmental condition sensor that monitors engine environmental conditions, the engine environmental condition sensor electronically communicates monitored engine environmental data as engine condition information to the one or more data processors.

In addition to one or more of the features described above, or as an alternative, further embodiments may include that blade health sensors sense exhibited noise levels and blade clearances.

In addition to one or more of the features described above, or as an alternative, further embodiments may include that environmental condition sensors sense one or more of geographic location, air temperature, air humidity, air pressure, altitude, or air speed.

In addition to one or more of the features described above, or as an alternative, further embodiments may include that accumulator information is $P(1, \ldots, N)=1-[1-P1]*[1-P2]*[1-P3]* \ldots *[1-PN]$, and $P(1, \ldots, N)$ is an accumulated probability of a FOD event throughout runs 1 to N.

In addition to one or more of the features described above, or as an alternative, further embodiments may include that predictor and inspection planner information is $P(1 \ldots N \ldots N^*)=1-[1-P1]*[1-P2]*[1-P3]* \ldots *[1-PN]* \ldots *[1-PN^*]$, $P(1 \ldots N \ldots N^*)$ is the probability of a FOD event over a next several runs $N+1 \ldots N^*$, $PN+1$=Estimated FOD Probability for run $N+1$, and $PN^*$ is the probability of a FOD event for run $N^*$.

In addition to one or more of the features described above, or as an alternative, further embodiments may include that a borescope inspection is automatically scheduled after run $N^*$ when $P(1 \ldots N \ldots N^*)$ is greater than a predefined threshold indicative of a probability of a FOD event occurring after run N.

In addition to one or more of the features described above, or as an alternative, further embodiments may include a gas turbine engine, the gas turbine engine including a fan and compressor section and a turbine section, the fan and compressor section including the first onboard debris sensor, one or both of the fan and compressor section or the turbine section including the onboard blade health sensor, and the turbine section including the second onboard debris sensor.

In addition to one or more of the features described above, or as an alternative, further embodiments may include an engine performance and lifing monitoring system, the engine performance and lifing monitoring system includes an onboard engine performance and lifing sensor that monitors engine performance and lifing conditions, the engine performance and lifing monitoring system communicates monitored engine performance and lifing data as engine condition information to the one or more data processors.

In addition to one or more of the features described above, or as an alternative, further embodiments may include that engine performance and lifing sensors sense one or more of gas-path operational temperatures, pressures and noise.

In addition to one or more of the features described above, or as an alternative, further embodiments may include a user interface in communication with the one or more processors, the one or more processors communicate with the user interface the timeframe for a next one or more borescope inspections predicted to occur before a FOD event.

In addition to one or more of the features described above, or as an alternative, further embodiments may include a borescope inspection scheduling module that automatically schedules a next one or more borescope inspections predicted to occur before a FOD event.

Further disclosed is a method of identifying a timeframe for borescope inspection of a gas turbine engine, comprising: electronically sensing conditions of the engine with a plurality of engine monitoring systems; electronically deriving engine condition information from the sensed engine conditions and communicating the engine condition information to one or more processors; electronically providing the engine condition information to a feature interpreter module on the one or more processors for processing and deriving a probability PN of the given run N of a FOD event, and communicating PN to the one or more processors; electronically providing the PN and data representing time since a last borescope inspection to an accumulator module on the one or more processors for processing and deriving an accumulated probability $P(1, \ldots, N)$ of a FOD event throughout runs 1 to N, and communicating $P(1, \ldots, N)$ to the one or more processors; electronically providing $P(1, \ldots, N)$ to a predictor and inspection planner module on the one or more processors for processing and deriving a probability $P(1 \ldots N \ldots N^*)$ of a FOD event occurring over runs $N+1 \ldots N^*$; electronically comparing $P(1 \ldots N \ldots N^*)$ to a predetermined risk limit with the predictor and inspection planner module and identifying a run N at which $P(1 \ldots N \ldots N^*) \geq$ the predetermined risk limit, identifying a timeframe for one or more borescope inspections.

In addition to one or more of the features described above, or as an alternative, further embodiments may include electronically communicating the timeframe for one or more borescope inspections to a user device after identifying the run N at which $P(1 \ldots N \ldots N^*) \geq$ the predetermined risk limit.

In addition to one or more of the features described above, or as an alternative, further embodiments may include scheduling a borescope inspection after identifying the run N at which $P(1 \ldots N \ldots N^*) \geq$ the predetermined risk limit.

In addition to one or more of the features described above, or as an alternative, further embodiments may include one or more of: sensing debris in a fan and compressor section with a first debris monitoring system, the first debris monitoring system including a first onboard debris sensor, the first debris monitoring system electronically communicating monitored first debris data as engine condition information to the one or more data processors; sensing blade health in one or both of the fan and compressor section and a turbine section with a blade health monitoring system, the blade health monitoring system including an onboard blade health sensor, the blade health monitoring system electronically communicating monitored blade health data as engine condition information to the one or more data processors; sensing debris in a turbine section with a second debris monitoring system, the second debris monitoring system including an second onboard debris sensor, the second debris monitoring system electronically communicating monitored second debris data as engine condition information to the one or more data processors; or sensing engine environmental conditions with an environmental condition monitoring system, the engine environmental condition monitoring system including an onboard engine environmental condition sensor, the engine environmental condition sensor electronically communicating monitored engine environmental data as engine condition information to the one or more data processors.

In addition to one or more of the features described above, or as an alternative, further embodiments may include sensing engine performance and lifing conditions with an engine performance and lifing monitoring system, the engine performance and lifing monitoring system including an onboard engine performance and lifing sensor, the engine performance and lifing monitoring system communicating monitored engine performance and lifing data as engine condition information to the one or more data processors.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
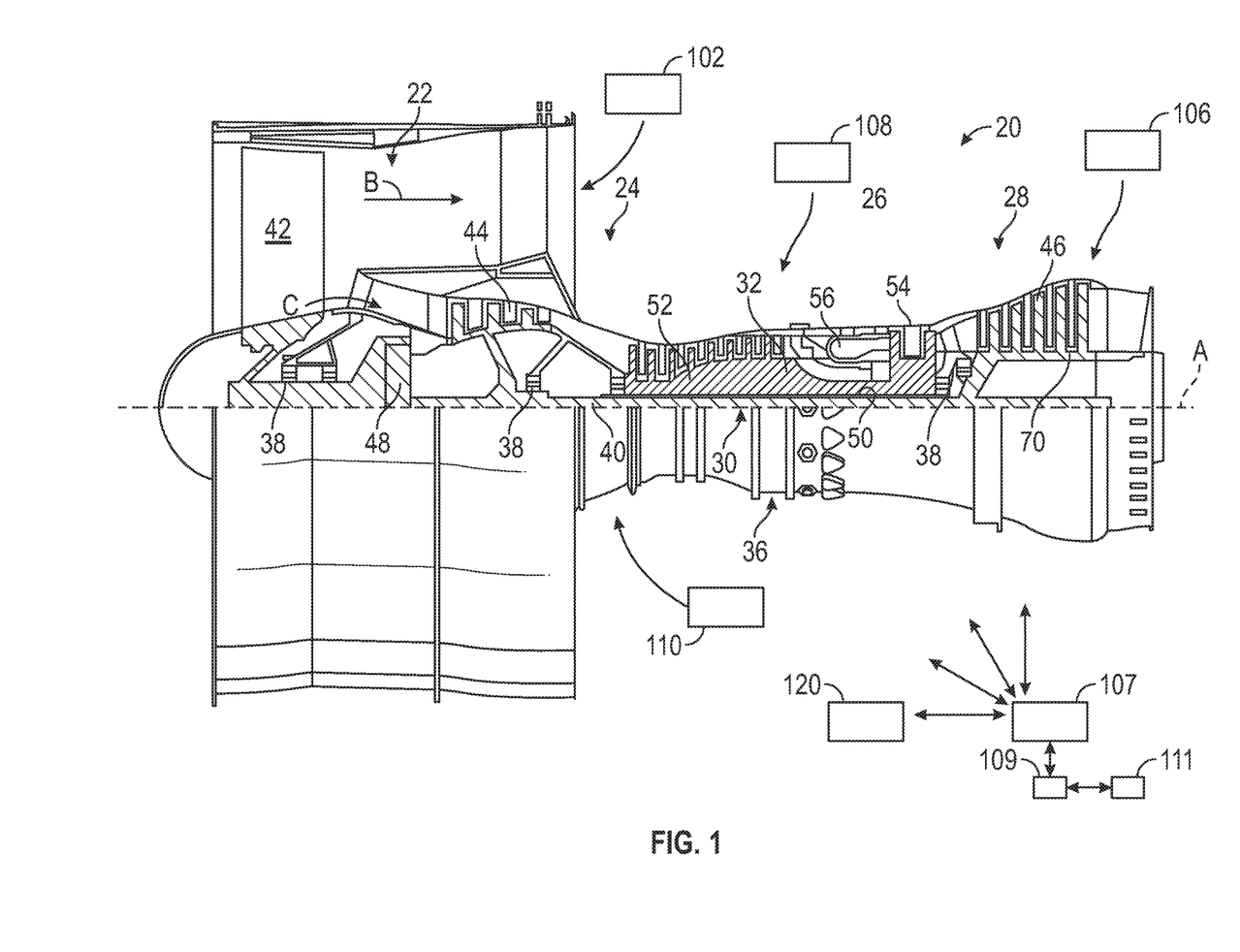
FIG. 1 is a cross sectional view of a gas turbine engine.
Figure 2:
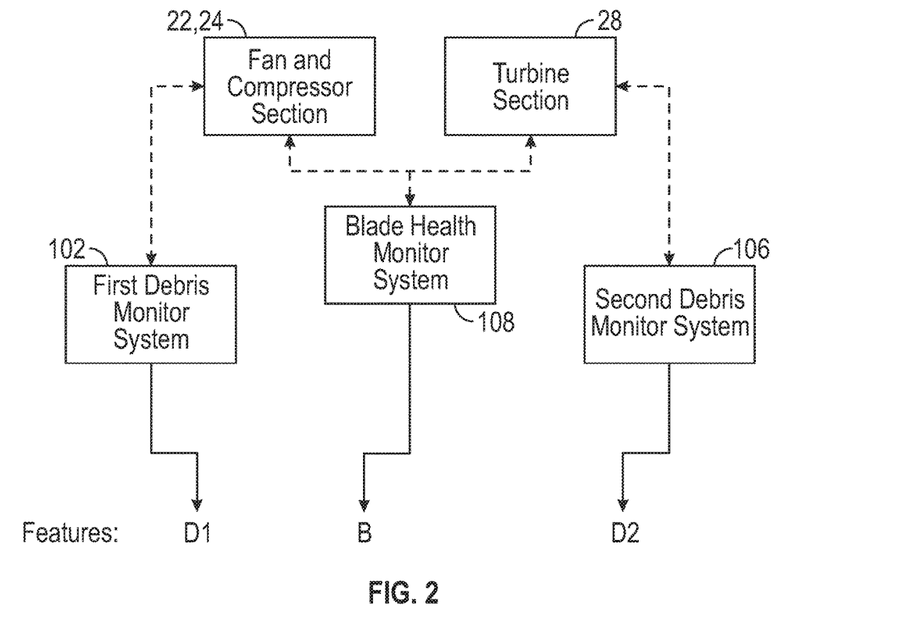
FIG. 2 is a schematic illustration of components of one disclosed embodiment.
Figure 3:
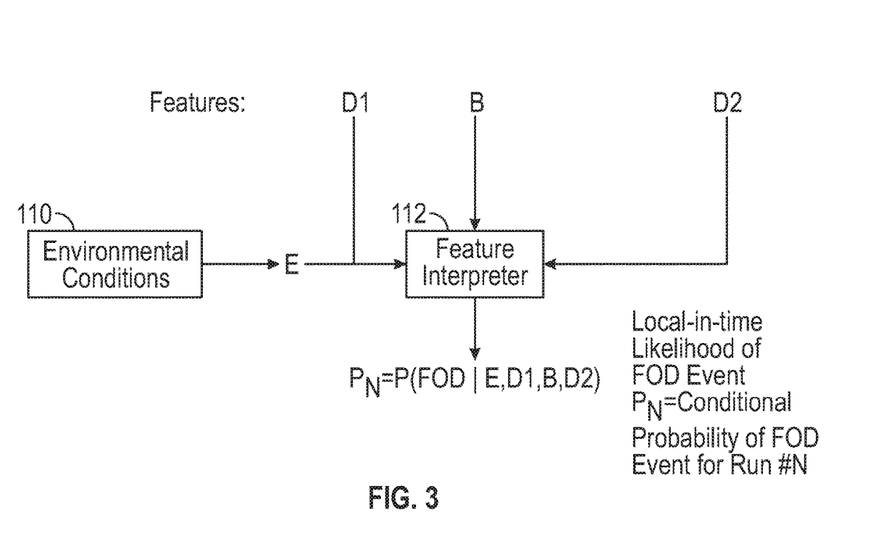
FIG. 3 is a schematic illustration of additional components of one disclosed embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second (350.5 m/sec).

Further disclosed herein is a system and method for a predicting when to perform a borescope inspection on a subsystem of a gas turbine engine based on a probability of the occurrence of a FOD event. The probability of a FOD event may be determined in part on an accumulated time since a previous borescope inspection and in part on a continuous collection and assessment of data indicative of a FOD event.

Data indicative of a FOD event may include relevant signals and signatures from a plurality of dynamically monitored engine system activities. The monitored systems may include one or more of an inlet debris monitoring system, a blade health monitoring system, an exhaust debris monitoring system, gas-path performance monitoring systems, or additional operational parameters and environmental data. Operational and environmental data may be measured and processed onboard or at a ground station. Monitored relevant event data may include sensor communication impairments and interruptions, whether temporary or permanent. Other forms of data may include data models for example durability models such as hot section durability models.

A timeframe for an occurrence of the FOD event may be predicted for example when a computed probability estimation exceeds a defined risk threshold and the risk threshold may be determine from empirical evidence. Yet further a probability of a future FOD event may be determined from an accumulated FOD probability based on collected and processed data. The resulting probability of a FOD event may be applied to a risk model that determines when a next borescope inspection or series of inspections may be performed such that a risk factor remains below a threshold.

Continuously monitoring to observe and process FOD event indicators may enable prediction of a relative need for an inspection. In addition an inspection timeframe may be obtained from processing cumulatively monitored and collected data. This process may increase a mean time between maintenance inspections while maintaining risk level below acceptable levels. Corrections may be instituted to avoid false alarms that may otherwise result from noisy hardware systems impacting the calculated probabilities of needing an inspection.

Turning now to FIGS. 1, 2, 6 and 7, a plurality of engine systems from the engine 20 and a respective plurality of monitoring systems for monitoring the engine systems are illustrated. Illustrated in FIG. 8 is a corresponding method for planning engine borescope inspections based on FOD probability estimations.

As illustrated in FIGS. 1, 2, 6 and 7, such engine systems may include the fan and compressor section 22, 24 in communication with a First Debris Monitoring System 102 the output of which is labeled D1. The turbine section 28 may be in communication with a Second Debris Monitoring System 106 the output of which is labeled D2. A Blade Health Monitoring System 108 may have an output which is labeled B, based on measuring such conditions as noise and blade clearances, which are non-limiting examples. The First Debris Monitoring System 102, the Second Debris Monitoring System 106 and the Blade Health Monitoring System may include typical onboard sensors communicating with data processors 107 that may be onboard or remote.

Outputs in D1 may include, for example, various signal features calculated over a running time window including a running average, variance, kurtosis, higher statistical moments, minimum or maximum values, or a distance metric calculated with a mathematical norm that represents proximity of signals to known signatures induced by debris. Outputs in D1 may also include mathematical transformations such as a Fourier transform, wavelet transform, or other projection methods. Outputs in D1 may also represent sensor health condition which establish a typical, or expected noise level to be exhibited by the signal under nominal conditions. Outputs in D1 may be continuous variables, discrete variables, binary variables, or a combination thereof. Outputs in D1 may be determined based on data from a current engine run or a collection of previous engine runs from the same engine or based on comparison of data from multiple engines stored in a database.

Outputs of D2 and B may be calculated in a similar manner as those calculated for D1. Aggregated features may be calculated from the individual outputs D1, D2, and B. Examples may include multivariable statistical features or distance values calculated with metrics that take into account a multi-dimensionality of D1, D2, and B. Normalization, scaling, and/or weighting of individual features may be required before a calculation of aggregated features.

In FIGS. 1, 3, 6 and 7, the output D1, D2, and B and output E of monitored conditions from an Environmental Conditions Monitoring System 110 may be fed to a Feature Interpreter 112, which is a software module. The Environmental Conditions Monitoring System 110 may also include typical onboard sensors communicating with data processors 107 that may be onboard or remote. Similarly, the Feature Interpreter 112 may be executed on onboard or remote data processors 107. Examples of output E may include: geographic location, air temperature, air humidity, air pressure, altitude, air speed, etc. Producing output E may also include comparing the current information to an onboard or remote database and applying corrections as needed.

The Feature Interpreter 112 may provide a local-in-time conditional probability of a FOD ingestion event. Time-locality may be defined as a running time window, the aggregation of the entire engine run, separate time-limited segments of the engine run, or combinations thereof. Output of the Feature Interpreter 112 may be:

$$P_N = P(FOD|E, D1, D2, B)$$

$P_N$ may be the probability at (or time element index of) a given run N of a FOD event at a predicted time as a function of E, D1, D2 and B. For example, D1, D2, and B all may be in the nominal or average range, and $P_N$ may represent the probability of a FOD event in a given set of environmental conditions E. Further expanding this example E may represent standard day weather conditions at a common geographical location, and $P_N$ may represent the probability of a FOD event under normal conditions.

The calculation of $P_N$ may be through an analysis of multivariate statistical cumulative distributions and/or correlations. The output $P_N$ may be calculated through matching the parameters E, D1, D2, B to set target patterns that may be assigned to a value of $P_N$. The output $P_N$ may be calculated by comparing individual features in E, D1, D2, B to different thresholds, either individually or in combination. The output $P_N$ may be determined by applying a set of logical operations (AND, OR, NOT) in a predetermined sequence.

Figure 4:
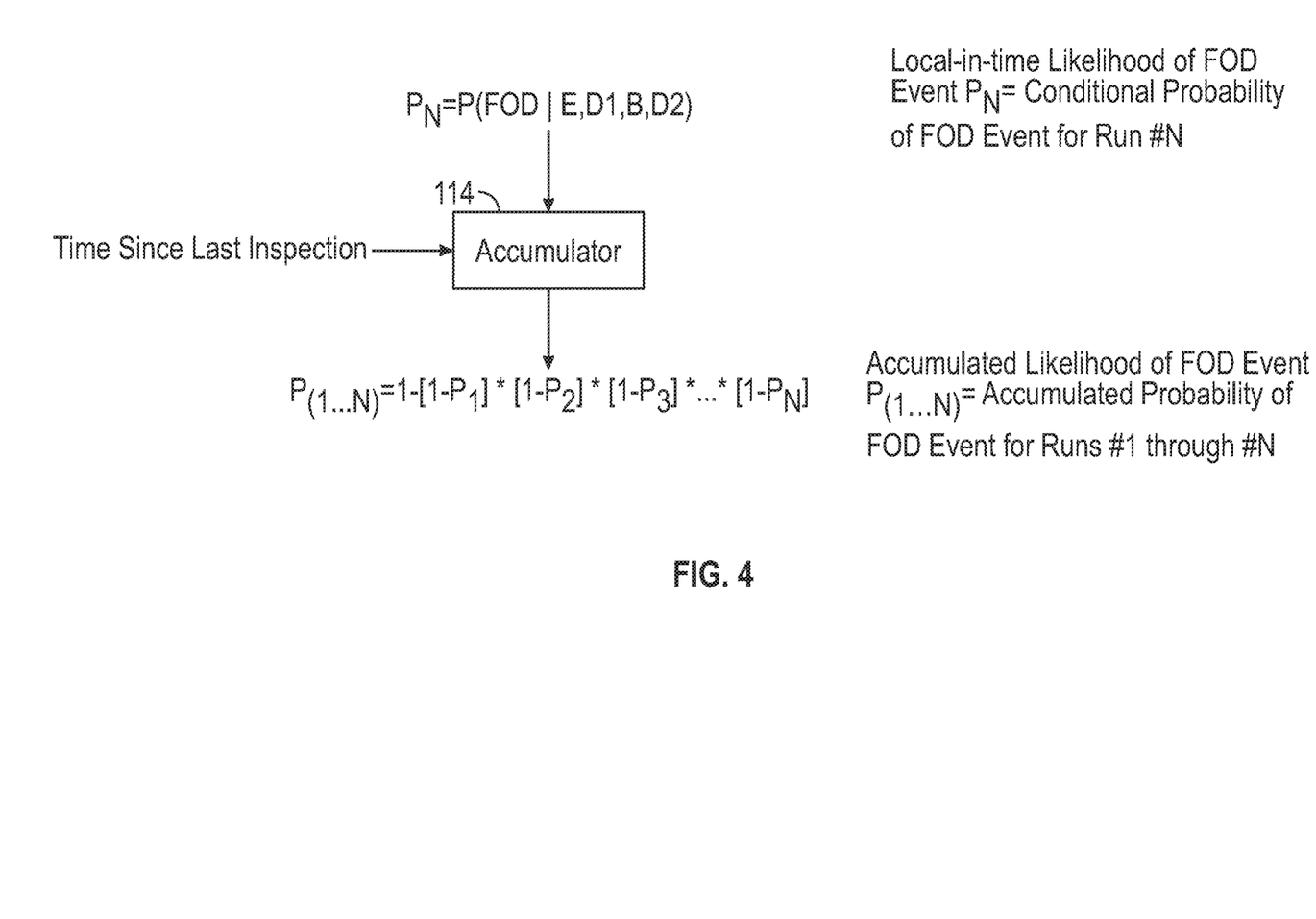
FIG. 4 is a schematic illustration of additional components of one disclosed embodiment.
Figure 6:
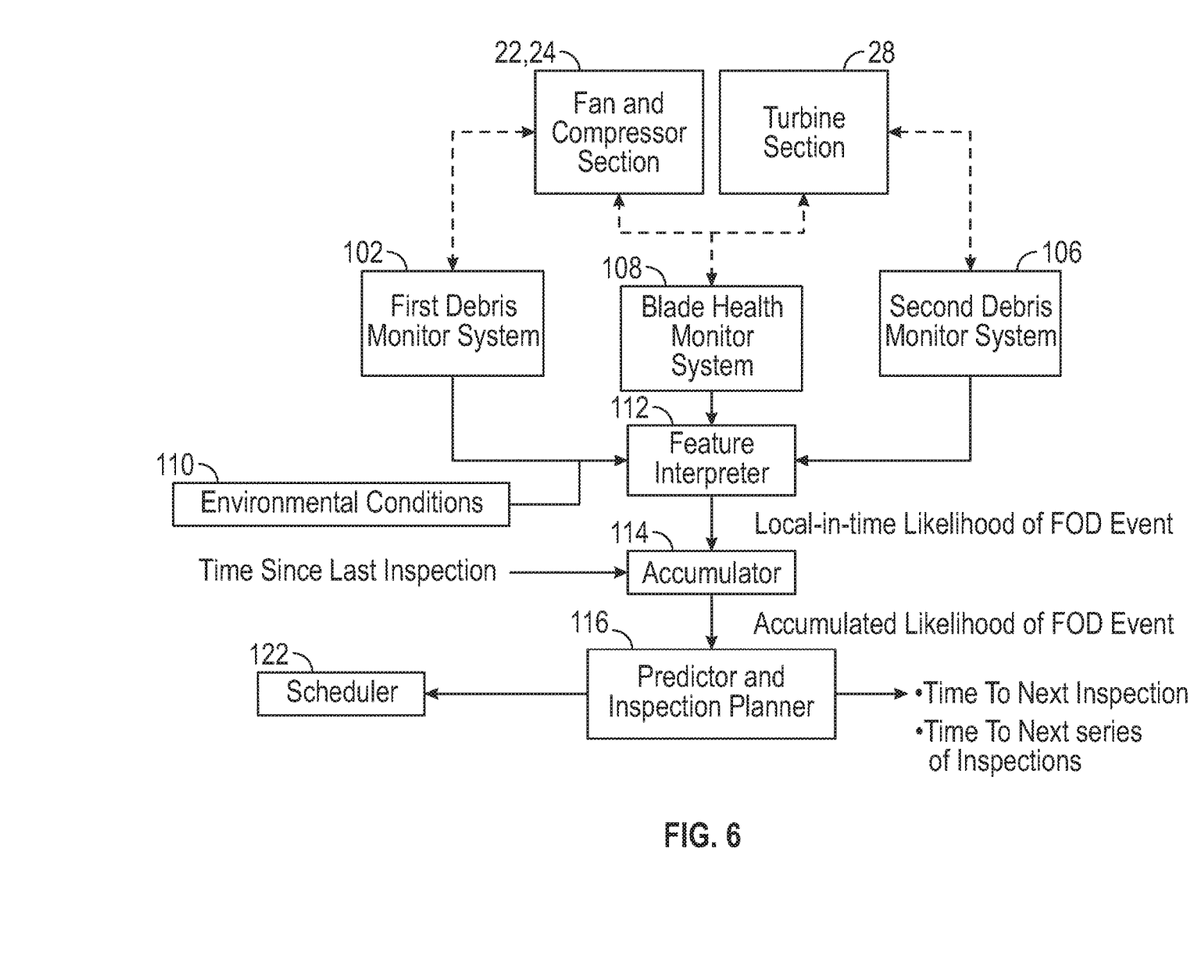
FIG. 6 is an additional schematic illustration of the components of the one disclosed embodiment illustrated in FIGS. 2-5.
Figure 7:
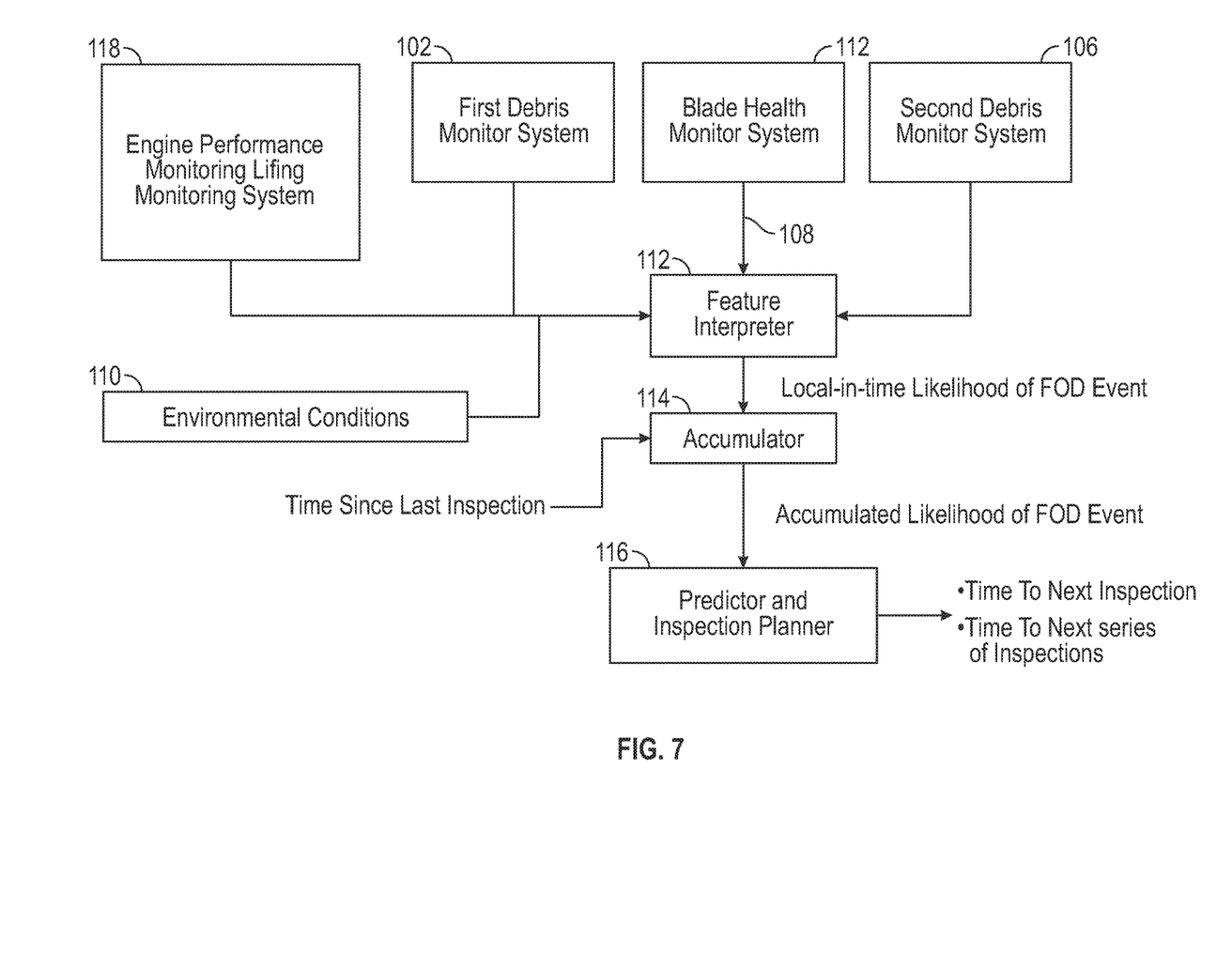
FIG. 7 is a schematic illustration of components of one disclosed embodiment.
Figure 8:
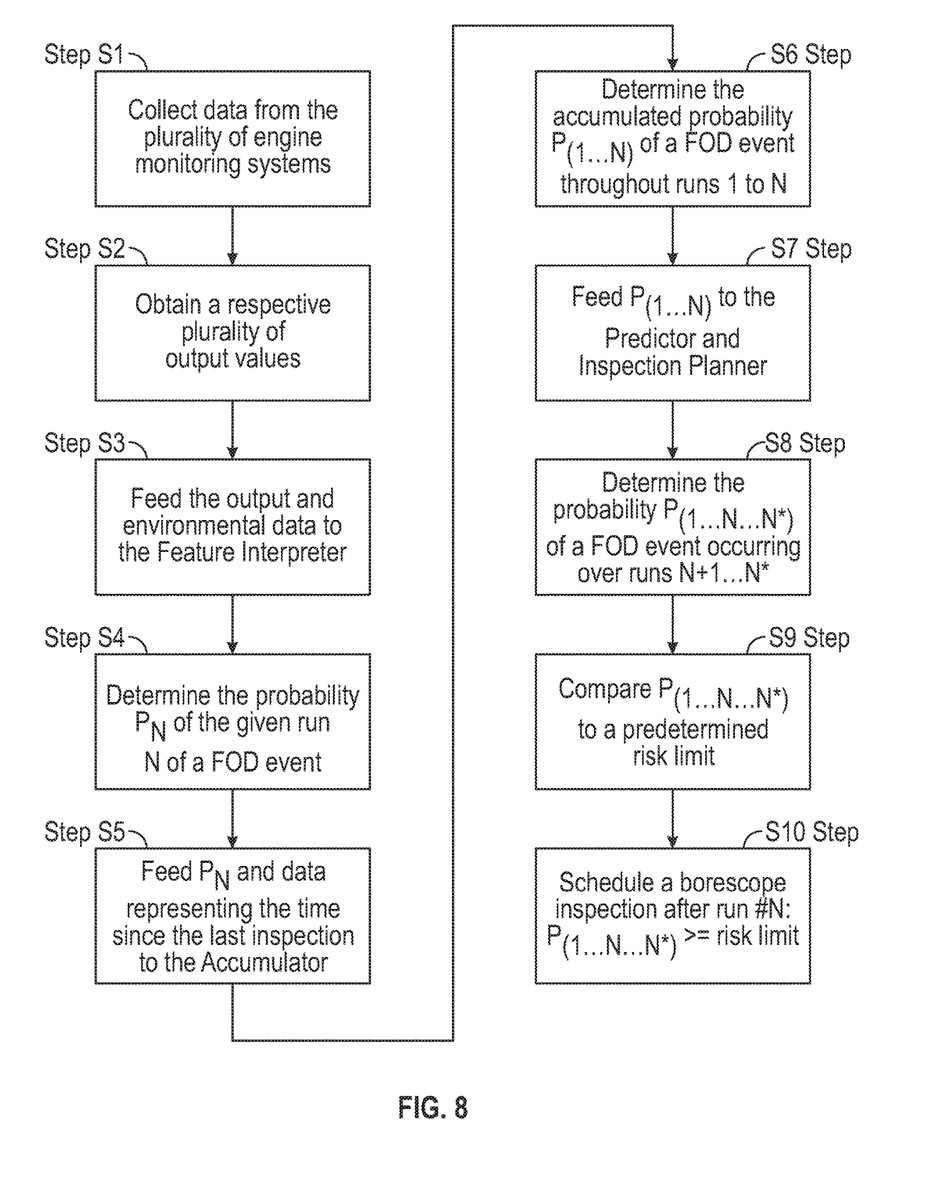
FIG. 8 is a flowchart of a method according to the disclosed embodiments.

In FIGS. 4, 6 and 7, $P_N$ may be fed to an Accumulator 114, which is a software module, along with data representing time since a last inspection. The Accumulator 114 may be executed on onboard or remote data processors 107. The Accumulator 114 may compile a running total of the aggregate risk, or probability of a FOD event since the last inspection. Under nominal conditions, the Accumulator 114 may be redundant with a time or cycle counter. In a general setting, the Accumulator 114 tallies the aggregated probability of a FOD event since the last inspection. This may lead to a reduced amount of time allowed before the next inspection. The time since a last inspection may be represented by number of operating hours, number of flight hours, and/or number of power cycles, which are non-limiting examples. An example output from the Accumulator 114 may be:

$$P_{(1, \ldots, N)} = 1 - [1-P_1]*[1-P_2]*[1-P_3]* \ldots *[1-P_N].$$

$P_{(1, \ldots, N)}$ may represent an accumulated probability of a FOD event throughout runs 1 to N. More generally, the calculation of $P_{(1, \ldots, N)}$ may be from a calculation that applies different scaling (or importance weights) to each of the time-local probabilities $P_{j\ (j=1, \ldots, N)}$. An example may be that $P_{(1, \ldots, N)} = P_N$ (all other weights set to zero (0)).

Figure 5:
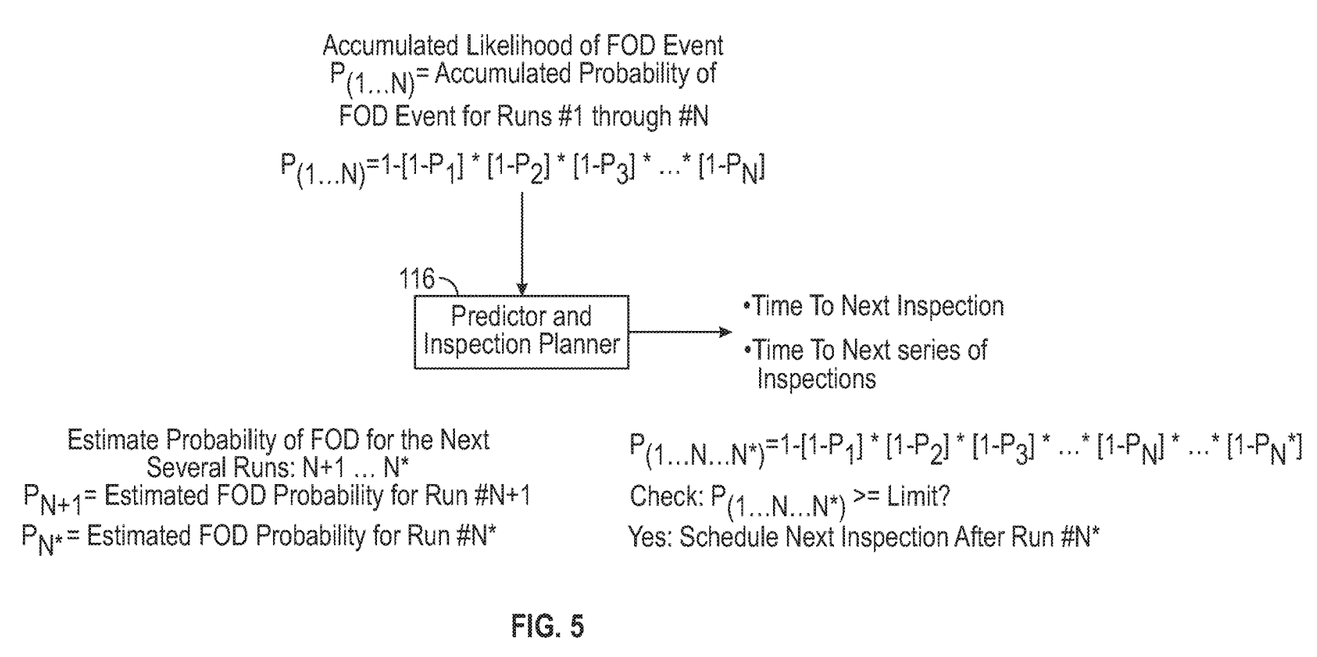
FIG. 5 is a schematic illustration of additional components of one disclosed embodiment.

Turning to FIGS. 5, 6 and 7, $P_{(1, \ldots, N)}$ may be fed to a Predictor and Inspection Planner 116, which is a software module. The Predictor and Inspection Planner 116 may be executed on onboard or remote data processors 107. The Predictor and Inspection Planner 116 may provide the expected time that the next inspection may be performed. The Predictor and Inspection Planner 116 may provide the nominal time remaining in the time counter, either in operating hours, flying hours, or remaining number of power cycles, as non-limiting examples. The Predictor and Inspection Planner 116 may also provide a modified time until the next inspection is required with the accumulated FOD probability increases. This modified time may be shorter than the nominal time if the previous values of $P_N$ were higher than normal. The modified time may be longer than the nominal time if the previous values of $P_N$ were lower than normal. The output of Predictor and Inspection Planner 116 may be:

$$P_{(1 \ldots N \ldots N^*)} = 1 - [1-P_1]*[1-P_2]*[1-P_3]* \ldots *[1-P_N]* \ldots *[1-P_{N^*}]$$

$P_{(1 \ldots N \ldots N^*)}$ may estimate the probability of a FOD event over a next several runs: N+1 . . . N*. In this series, the probabilities of a FOD event at the initial and final events may be:

$P_{N+1}$=Estimated FOD Probability for run N+1; and $P_{N^*}$=Estimated FOD Probability for run N*.

This information may be indicative of one or both of a time to a next inspection, and a time to a next series of inspections. The value of $P_{(1 \ldots N \ldots N^*)}$ may be checked against a threshold risk limit. When $P_{(1 \ldots N \ldots N^*)}$ is greater than or equal to the threshold risk limit, the next inspection may occur after run N*. That is, the following algorithm may be applied:

Check: $P_{(1 \ldots N \ldots N^*)} \geq$ Limit?

Yes: Schedule next borescope inspection after run N*.

As illustrated in FIGS. 1 and 6 the resulting time remaining to the next inspection may be communicated to a user, e.g., via a user interface 120 in electronic communication with the data processors 107. The user interface 120 may be a hand held smart device or other device capable of automatically or selectively providing notification of a need to schedule a borescope inspection. Automatically setting an inspection schedule with a scheduler 122, which is a software module, is within the scope of the disclosed embodiments. The scheduler 122 may communicate the user interface 120 to inform the user of the next scheduled inspection or series of inspections.

FIG. 7 illustrates an alternative embodiment, in which an Engine Performance and Lifing Monitoring System 118 may feed additional monitoring data, such as gas-path operational temperatures, pressures and noise, as non-limiting examples, to the Feature Interpreter 112. Engine Performance and Lifing Monitoring System 118 may also include typical onboard sensors communicating with data processors that may be onboard or remote. All other features and components of the alternative embodiment are as illustrated in FIG. 6. In addition the alternative embodiment is adequately described in the method illustrated in FIG. 2.

As illustrated in FIG. 8 a first Step S1 in the method of identifying a timeframe for performing a borescope inspection may be collecting data from the plurality of engine monitoring systems 102, 106, 108. A second Step S2 may be obtaining a respective plurality of output values D1, B, D2 from the engine monitoring systems 102, 106, 108 obtained in Step S1.

A third Step S3 may be feeding the output from Step S2 along with environmental conditions data to the Feature Interpreter 112. The fourth Step S4 may be determining the probability $P_N$ of the given run N of a FOD event based on the input from Step S3. A fifth Step S5 may be feeding $P_N$ and data representing the time since the last inspection to the Accumulator. A sixth Step S6 may be determining the accumulated probability $P_{(1, \ldots, N)}$ of a FOD event throughout runs 1 to N.

A seventh Step S7 may be feeding $P_{(1 \ldots N)}$ to the Predictor and Inspection Planner 116. An eighth Step S8 may be determining the probability $P_{(1 \ldots N \ldots N^*)}$ of a FOD event occurring over runs N+1 . . . N*. A ninth Step S9 may be comparing $P_{(1 \ldots N \ldots N^*)}$ to a predetermined risk limit. A tenth Step S10 may be scheduling a borescope inspection after run N which may be after $P_{(1 \ldots N \ldots N^*)} \geq$ predetermined risk limit. Operating time index N defining the time remaining until the next inspection may be represented by N*−N. For predictive purposes, each of the local-in-time probabilities $P_{(N+1)}$, et seq., may be estimated based on nominal FOD probabilities, or an average of the past probabilities $P_j$ where j=1, . . . N. Local-in-time probabilities $P_{(N+1)}$, et seq., may be a function depending on the previous probabilities $P_{j(j=1, \ldots, N)}$.

The term "about" is intended to include the degree of error associated with measurement of the particular quantity based upon the equipment available at the time of filing the application. For example, "about" can include a range of ±8% or 5%, or 2% of a given value.

Referring now to FIG. 1 a schematic illustration of the data processor 107 is provided. Data processor 107 may comprise a computer, microprocessor, microcontroller or microchip 109 that runs a computer program to find zero crossings of voltage and current and determines Δt between them using a reference 111. In an exemplary embodiment, the above disclosed embodiments may comprise a microprocessor, microcontroller or other equivalent processing device capable of executing commands of computer readable data or program for executing a control algorithm that controls relevant system operations. In order to perform the prescribed functions and desired processing, as well as the computations therefore (e.g., the execution of fourier analysis algorithm(s), control processes prescribed herein, and the like), a controller, which may be the processor 107 or another processor, may include, but not be limited to, a processor(s), computer(s), memory, storage, register(s), timing, interrupt(s), communication interfaces, and input/output signal interfaces, as well as combinations comprising at least one of the foregoing. For example, a controller may include input signal filtering to enable accurate sampling and conversion or acquisitions of such signals from communications interfaces. As described above, exemplary embodiments of the present disclosure may be implemented through computer-implemented processes and apparatuses for practicing those processes.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system for identifying a timeframe for a next one or more borescope inspections for a gas turbine engine, comprising:

one or more monitoring systems that monitor conditions of the engine, the one or more monitoring systems derive engine condition information and communicate the engine condition information to one or more data processors;

a feature interpreter module that electronically communicates with the one or more data processors to process the engine condition information, the feature interpreter module electronically communicates feature interpreter information to the one or more data processors, wherein the feature interpreter information defines a probability of a Foreign Object Detection (FOD) event;

an accumulator module that electronically communicates with the one or more data processors to processes the feature interpreter information, stored information since a last borescope inspection, and the accumulator module electronically communicates accumulator information to the one or more data processors, wherein the accumulator information defines an accumulated probability of a FOD event;

a predictor and inspection planner module that electronically communicates with the one or more processors to processes the accumulator information and stored information that defines a threshold limits for a probability of a FOD event, and the predictor and inspection planner module electronically communicates predictor and inspection planner information to the one or more data processors, the predictor and inspection planner information identifies a timeframe for a next one or more borescope inspections predicted to occur before a FOD event; and wherein:

accumulator information is $P_{(1\ldots N)}=1-[1-P_1]*[1-P_2]*[1-P_3]*\ldots*[1-P_N]$, and $P_{(1\ldots N)}$ is an accumulated probability of a FOD event throughout runs 1 to N; and the system comprises one or more of:

(i) a first debris monitoring system, the first debris monitoring system includes a first onboard debris sensor that monitors debris from a fan and compressor section, the first debris monitoring system electronically communicates monitored first debris data as engine condition information to the one or more data processors;

(ii) a blade health monitoring system, the blade health monitoring system includes an onboard blade health sensor that monitors blade health from one or both of the fan and compressor section and a turbine section, the blade health monitoring system electronically communicates monitored blade health data as engine condition information to the one or more data processors, wherein the blade health sensors sense exhibited noise levels and blade clearances;

(iii) a second debris monitoring system, the second debris monitoring system includes an second onboard debris sensor that monitors debris from a turbine section, the second debris monitoring system electronically communicates monitored second debris data as engine condition information to the one or more data processors; and (iv) an engine environmental condition monitoring system, the engine environmental condition monitoring system includes an onboard engine environmental condition sensor that monitors engine environmental conditions, the engine environmental condition sensor electronically communicates monitored engine environmental data as engine condition information to the one or more data processors, wherein the environmental condition sensors sense one or more of geographic location, air temperature, air humidity, air pressure, altitude, or air speed.

2. The system of claim 1, wherein predictor and inspection planner information is $P_{(1\ldots N\ldots N^*)}=1-[1-P_1]*[1-P_2]*[1-P_3]*\ldots*[1-P_{N^*}]$, $P_{(1\ldots N\ldots N^*)}$ is the probability of a FOD event over a next several runs $N+1N^*$, $P_{N+1}$=Estimated FOD Probability for run N+1, and $P_{N^*}$ is the probability of a FOD event for run $N^*$.

3. The system of claim 2, wherein a borescope inspection is automatically scheduled after run $N^*$ when $P_{(1\ldots N\ldots N^*)}$ is greater than a predefined threshold indicative of a probability of a FOD event occurring after run N.

4. The system of claim 3, further comprising a gas turbine engine, the gas turbine engine including a fan and compressor section and a turbine section, the fan and compressor section including the first onboard debris sensor, one or both of the fan and compressor section or the turbine section including the onboard blade health sensor, and the turbine section including the second onboard debris sensor.

5. The system of claim 4, including an engine performance and lifing monitoring system, the engine performance and lifing monitoring system includes an onboard engine performance and lifing sensor that monitors engine performance and lifing conditions, the engine performance and lifing monitoring system communicates monitored engine performance and lifing data as engine condition information to the one or more data processors.

6. The system of claim 5, wherein engine performance and lifing sensors sense one or more of gas-path operational temperatures, pressures and noise.

7. The system of claim 1 comprising a user interface in communication with the one or more processors, the one or more processors communicate with the user interface the timeframe for a next one or more borescope inspections predicted to occur before a FOD event.

8. The system of claim 1 comprising a borescope inspection scheduling module that automatically schedules a next one or more borescope inspections predicted to occur before a FOD event.

9. A method of identifying a timeframe for borescope inspection of a gas turbine engine, comprising:

electronically sensing conditions of the engine with a plurality of engine monitoring systems;

electronically deriving engine condition information from the sensed engine conditions and communicating the engine condition information to one or more processors;

electronically providing the engine condition information to a feature interpreter module on the one or more processors for processing and deriving a probability $P_N$ of the given run N of a FOD event, and communicating $P_N$ to the one or more processors;

electronically providing the $P_N$ and data representing time since a last borescope inspection to an accumulator module on the one or more processors for processing and deriving an accumulated probability $P_{(1,\ldots,N)}$ of a FOD event throughout runs 1 to N, and communicating $P_{(1,\ldots,N)}$ to the one or more processors;

electronically providing $P_{(1,\ldots,N)}$ to a predictor and inspection planner module on the one or more processors for processing and deriving a probability $P_{(1\ldots N\ldots N^*)}$ of a FOD event occurring over runs N+1 ... N*;

electronically comparing $P_{(1\ldots N\ldots N^*)}$ to a predetermined risk limit with the predictor and inspection planner module and identifying a run N at which $P_{(1\ldots N\ldots N^*)}>=$the predetermined risk limit, identifying a timeframe for one or more borescope inspections.

10. The method of claim 9 further comprising electronically communicating the timeframe for one or more borescope inspections to a user device after identifying the run N at which $P_{(1\ldots N\ldots N^*)}>=$the predetermined risk limit.

11. The method of claim 9 further comprising electronically scheduling a borescope inspection after identifying the run N at which $P_{(1\ldots N\ldots N^*)}>=$the predetermined risk limit.

12. The method of claim 9 comprising one or more of:

sensing debris in a fan and compressor section with a first debris monitoring system, the first debris monitoring system including a first onboard debris sensor, the first debris monitoring system electronically communicating monitored first debris data as engine condition information to the one or more data processors;

sensing blade health in one or both of the fan and compressor section and a turbine section with a blade health monitoring system, the blade health monitoring system including an onboard blade health sensor, the blade health monitoring system electronically communicating monitored blade health data as engine condition information to the one or more data processors;

sensing debris in a turbine section with a second debris monitoring system, the second debris monitoring system including an second onboard debris sensor, the second debris monitoring system electronically communicating monitored second debris data as engine condition information to the one or more data processors; or sensing engine environmental conditions with an environmental condition monitoring system, the engine environmental condition monitoring system including an onboard engine environmental condition sensor, the engine environmental condition sensor electronically communicating monitored engine environmental data as engine condition information to the one or more data processors.

13. The method of claim 12, wherein accumulator module derives $P_{(1,\ldots,N^*)}=1-[1-P_1]*[1-P_2]*[1-P_3]* \ldots *[1-P_N]$, and $P_{(1,\ldots,N)}$ is an accumulated probability of a FOD event throughout runs 1 to N.

14. The method of claim 13, wherein predictor and inspection planner module derives $P_{(1\ldots N\ldots N^*)}=1-[1-P_1]*[1-P_2]*[1-P_3]* \ldots *[1-P_N]* \ldots *[1-P_{N^*}]$, $P_{1\ldots N\ldots N^*})$ is the probability of a FOD event over a next several runs N+1N*, $P_{N+1}$=Estimated FOD Probability for run N+1, and $P_{N^*}$ is the probability of a FOD event for run N*.

15. The method of claim 12, further comprising sensing engine performance and lifing conditions with an engine performance and lifing monitoring system, the engine performance and lifing monitoring system including an onboard engine performance and lifing sensor, the engine performance and lifing monitoring system communicating monitored engine performance and lifing data as engine condition information to the one or more data processors.

16. The method of claim 15, wherein engine performance and lifing sensors sense one or more of gas-path operational temperatures, pressures and noise.

* * * * *